July 31, 1956    K. T. PARSELL    2,756,632
SPECTACLE FRAME
Filed May 14, 1952
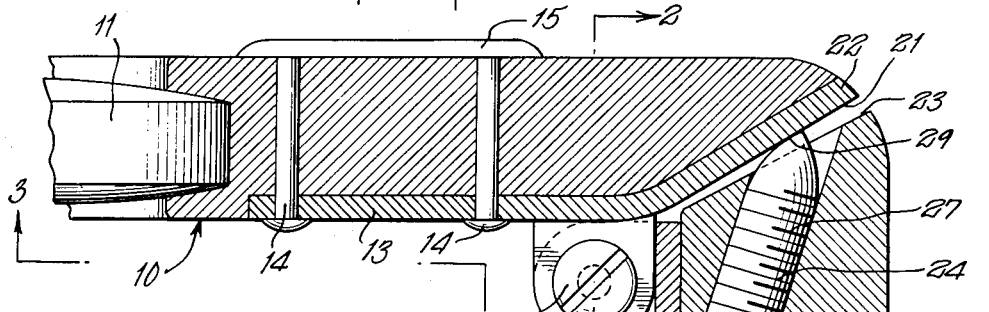
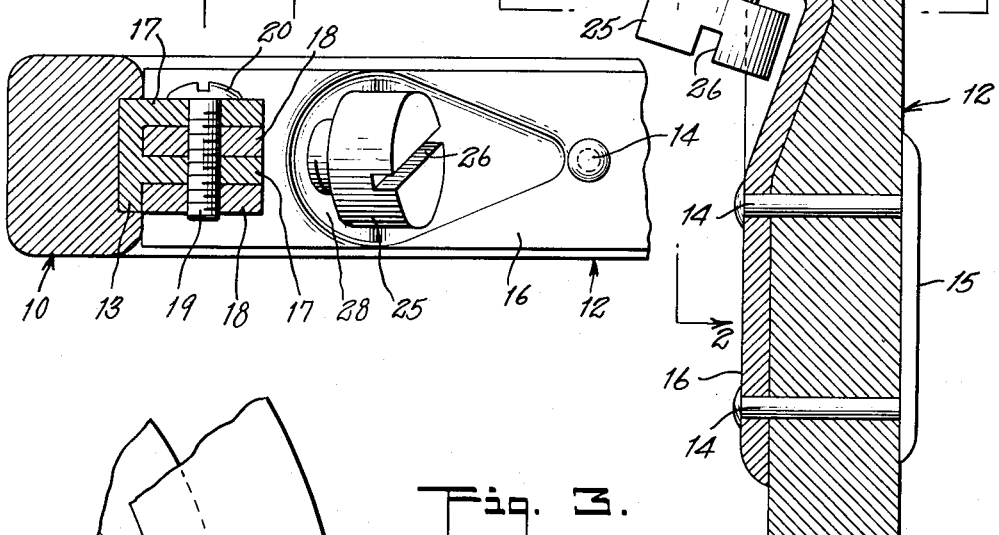
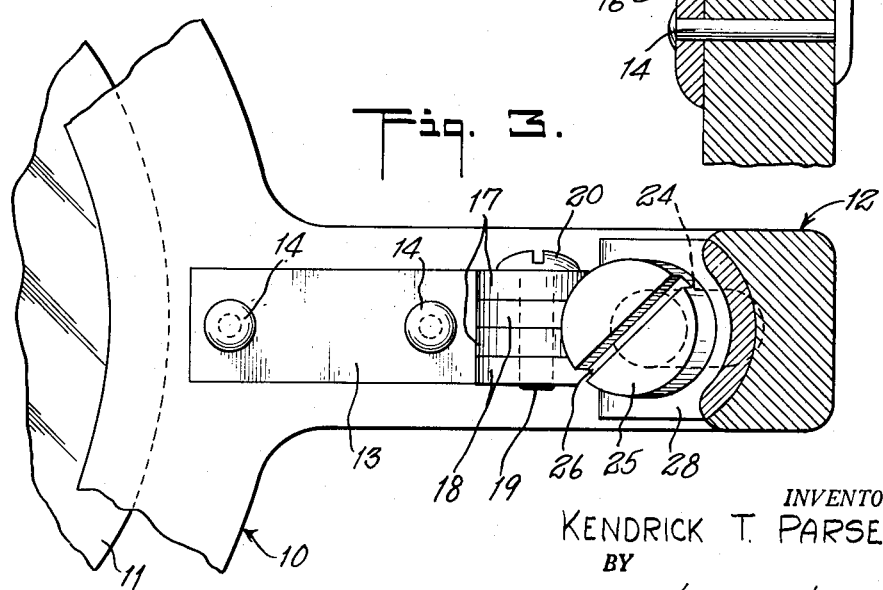
INVENTOR.
KENDRICK T. PARSELL
BY
Kenyon & Kenyon
ATTORNEYS

United States Patent Office 2,756,632
Patented July 31, 1956

2,756,632
SPECTACLE FRAME

Kendrick T. Parsell, Manhasset, N. Y.

Application May 14, 1952, Serial No. 287,702

4 Claims. (Cl. 88—53)

This invention relates to spectacle frames and relates more particularly to the combination of a spectacle frame comprising a frontal lens carrying portion and temples of a novel hinge structure for attaching the temples to the extremities of the frontal lens carrying frame.

The spectacle frames that in recent years have had the greatest popularity and most widespread use are of the so-called horn rim type wherein the frontal lens carrying portion and the temples are made from some suitable plastic material. In such spectacle frames the temples are commonly attached to the extremities of the frontal lens carrying frame by hinges which permit pivotal movement of the temples from position substantially overlying the frontal lens carrying frame to position substantially at 90° with respect thereto. Moreover in such spectacle frames it has been conventional to provide terminal surfaces for the adjacent end portions of the frontal lens carrying frame and temples which are adapted to come into abutting contacting relation when the temples are in position at approximately 90° to the frontal lens carrying frame and to cooperate with the hinges attached to the inner surface of these end portions to prevent pivotal movement of the temples substantially beyond the 90° position.

In spectacle frames having the general construction above described it is common practice to utilize temples which have adjacent the ear ends of the temples little or no curve downwardly about the ears. If the temple ends are curved downwardly about the ears it is inconvenient and clumsy both to put the spectacle frame in place with the temple ends about the ears and to remove the spectacle frame. It is much more convenient and, therefore, preferable to employ temples that are straight or nearly straight adjacent the ear ends thereof so that they can be put on and removed with a simple direct motion and using only one hand. However, when the temples are so constructed the spectacle frame is likely to be displaced upon even slight joggling so as to slide down the nose of the wearer to greater or less extent or with entire dropping off of the frame. To counteract such displacement the ear end of such temples generally follows to a slight extent the head contours in the vicinity of the ears, but unless the temples follow the head contours accurately and with substantial contact pressure accidental displacement of the spectacles is a matter of frequent occurrence.

In order to minimize such accidental displacement in the case of spectacle frames of the character above mentioned it is usually necessary or desirable to try out a number of different frames so as to select one that is so proportioned that the temples accommodate themselves to the head size for providing the desired amount of contact pressure against the sides of the head. Alternatively, in order to bring about a like result, it is common practice to carefully raise the temperature of the temples until the plastic material of which they are composed is softened and until the temples can be permanently reformed and set upon cooling so as to retain the reformed or corrected shape. However, this is an inconvenient expedient and at best is a matter of trial and error and is difficult to control. In the hands of an unskilled technician the temples are likely to become badly out of shape when subjected to such treatment.

A further difficulty incident to such spectacle frames results from the fact that even if the temples are originally fitted to provide desired pressure contact with the head contours in the vicinity of the ears, the nature of the plastic material of which the temples is composed is such that the temples gradually, during ordinary usage of the spectacle frame, become deformed so as to no longer exert desired contact pressure against the sides of the head and when this condition has progressed, even though relatively slightly, the spectacle frame becomes subject to the aforesaid objection of accidental displacement. In such case it becomes necessary in order to overcome the objection of being subject to accidental displacement to go through the above mentioned unsatisfactory heat softening and reforming operations of the temples. It is a serious objection for the user of such spectacle frames to have the temples reformed from time to time as necessity arises, especially since such reformation is one which ordinarily requires the services of a person having special skill.

In the past certain proposals have been made for imparting to the temples of spectacles a certain amount of resilient pressure exerted toward the sides of the head by associating springs with the hinges by which the temples are attached to the frontal lens carrying frame of spectacles. However, any such springs necessarily have to be relatively small and weak due to space and weight limitations and this fact coupled with low amount of possible leverage results in the pressure which can be exerted against the side of the head being relatively ineffective. Moreover, such pressure as can be exerted is fixed by the characteristics of the spring and is such that adjustment of the pressure is not possible. Since the parts are necessarily small and of light weight such structures are likewise flimsy and subject to breakage, and in addition such structures are relatively difficult to manufacture and assemble, thus adding substantially to the cost of the spectacles. A further objection to the use of springs is that the springs tend to resiliently and automatically swing to the temples inwardly from the wearing position wherein the temples are approximately 90° to the frontal lens carrying frame, and this tendency to swing inwardly is inconvenient to the user in putting the spectacles on, for, in order to put the spectacles on, the temples have to be moved outwardly so as to counteract the spring action and this is inconvenient to do unless two hands are employed.

It is an object of this invention to provide in combination with a spectacle frame a hinge structure which while of extremely simple and inexpensive construction successfully overcomes the above mentioned difficulties and disadvantages of spectacle frames heretofore used or proposed. It is a further object of this invention to provide a hinge structure such that the temples attached to a given frontal lens carrying frame can be readily adjusted to different head sizes. It is a further object of this invention to provide a hinge structure in a spectacle frame such that in the event of distortion of the temples so that desired pressure is no longer provided for pressing the temples against the sides of the head for holding the spectacles in place, the temples can be readily readjusted by the user for restoring the desired pressure. Other objects of this invention relate to the provision of a hinge structure such that the degree of pressure of the temples against the sides of the head can be adjusted by the user whenever he wishes to do so and exactly according to his individual liking in this regard and such that this result is accomplished by means that has a positive action and that does not result in any inconvenience when the spectacles are in normal use.

According to this invention improvements have been afforded in the hinge structure that is provided for attaching at least one of the temples to an extremity or end portion of the frontal lens carrying frame. The hinge tongues are attached to the inner surfaces of an end portion of the frontal lens carrying frame and the adjacent end portion of the temple; and the extremity or end portion of the frontal lens carrying frame and the adjacent end portion of the temples present terminal stop surfaces which are adapted to come into abutting relation upon pivotally swinging the temples about the hinge to position approximately 90° to the frontal lens carrying frame and which are adapted to cooperate with the hinge to prevent further outward pivotal movement of the hinge beyond the approximately 90° position. According to this invention there is provided in combination with the foregoing elements means for adjusting the setting of at least one of the aforesaid stop surfaces in a plurality of fixed positions for thereby determining as desired the angle that the temple makes with the frontal lens carrying frame when the stop surfaces are in abutting contacting relation. By thus providing adjustable stop means which can be held fixed in a plurality of different positions, the temples of the spectacle frame can be adjusted so that the amount of pressure exerted by the temples can be controlled as desired for different head sizes and so as to compensate as may be required from time to time because of gradual deformation of the temples. Moreover, the construction is strong, rugged, and positively acting, and is such that varying degrees of pressure can be exerted according to the wishes of the wearer up to the limits of the strength of the basic elements of the spectacle frame thereby enabling pressures to be exerted amply sufficient to meet the desires of any wearer while staying well within the strength limits of the spectacle parts.

Further features of this invention relate to the provision of a part such as a screw which is adjustably carried by the end portion of the temple or the end portion of the frontal lens carrying frame so as to present a stop surface whose position can be adjusted between positions substantially flush with the terminal surface of the end portion in which it is carried to position substantially protruding therefrom. When the stop surface of this part protrudes from the terminal surface of the end portion in which it is carried it is adapted to come into abutting contacting relation with the terminal surface of the other end portion, and since means is provided for fixing the position of the stop surface presented by the part in any of a plurality of positions of protrusion the angle that the temple makes with the frontal lens carrying element can be positively adjusted and determined for establishing desired contact pressure of the temples with the sides of the head of the wearer.

According to preferred practice of this invention one of the tongues of the hinge, preferably that attached to the inner surface of the temple, has an offset having an aperture through which a screw passes thereby increasing the strength of the parts associated with and holding the screw in place while at the same time facilitating the accessibility of the screw for manual adjustment. It is also preferable that the hinge tongue which comprises the offset extend beyond the offset so as to further increase the strength of the parts in the region of the hinge structure. According to a still further feature of preferred practice of this invention the terminal surface, against which the end of the screw providing the adjustably positionable stop surface is adapted to come into abutting contacting relation, is provided by an extension of the tongue of the hinge that is attached to the end portion having this terminal surface so as to provide metal-to-metal contact between the end of the screw and the other terminal surface.

Further objects, features and advantages of this invention will be apparent from the following description of a typical preferred embodiment of this invention which for exemplary and illustrative purposes has been shown in the accompanying drawings, wherein Fig. 1 is a plan view, mostly in section and on an enlarged scale, of a spectacle frame hinge structure embodying this invention;

Fig. 2 is a detail view partly in section taken on the line 2—2 of Fig. 1, and

Fig. 3 is a detail view partly in section taken on the line 3—3 of Fig. 1.

In the embodiment of this invention shown in the accompanying drawings the frontal lens carrying frame is indicated generally by the reference character 10. Since this invention is concerned with the hinge structure by which one or both of the temples is attached to the frontal lens carrying frame, only the end portion of the frontal lens carrying frame has been shown in the drawings. The frontal lens carrying frame may be of any conventional type and in Fig. 1 a portion only of one of the lenses 11 has been shown. The lenses 11 may be of the usual transparent corrective type, although they likewise may merely be made of colored plastic or glass such as the type of lens used in sunglasses.

One of the temples is indicated generally by the reference character 12 and this invention is concerned with the hinge structure by which the end portion or extremity of the frontal lens carrying frame 10 is attached to the adjacent end portion of the temple 12.

The hinge which is used to attach the temple 12 to the end portion of the lens carrying frame 10 may be similar to the type of hinge that is conventionally employed for attaching the temples to the extremities of a frontal lens carrying frame except for the modifications to be described hereinafter. The hinge comprises a tongue 13 which is attached to the end portion of the frontal lens carrying frame by suitable means such as the rivets 14 which extend through the end portion of the frontal lens carrying frame from a small plate 15 to which they are attached. Such means for holding a hinge tongue in place is conventional and when such means of attachment is employed it is usual practice to make the plate 15 which lies at the front of the end portion of the lens carrying frame 10 of such metal and shape as to be ornamental. While a particular means for attachment of the tongue 13 has been shown any other means for attaching the tongue 13 to the inner surface of the end portion of the lens carrying frame may be employed. The other tongue 16 is attached to the end portion of the temple 12 by similar attaching means, namely, the rivets 14 which extend through the end portion of the temple 12 to the plate 15. The balance of the temple 12 which is not shown may be of any conventional shape although this invention is of special utility when the ear end of the temple is of the type which has little or no downward curvature for following the contours of the back of the ears of the wearer. Both the temple 12 and the frontal lens carrying frame are ordinarily composed of some molded plastic material since this invention is of special advantage in connection with spectacle frames made of such material. However, it is apparent that any other type of material suitable for a spectacle frame may be employed.

The tongues 13 and 16 are pivotally united by the usual type of structure employed in a hinge for a spectacle frame. This structure comprises the laterally extending ears 17 which are rigidly carried by the tongue 13 and the ears 18 which are rigidly carried by the tongue 16. The ears 17 and 18 are interfitted with each other in slidable relation and are centrally apertured to receive the hinge pintle 19. Preferably the hinge pintle 19 is threaded as shown for threaded engagement with the lower ear 18, and the top of the pintle 19 is provided with a head 20 which can be gripped by a suitable tool, such as a screw driver, so that the pintle 19 can be rotated for adjusting the frictional resistance of the hinge to pivotal movement of the temple 12 from position substantially overlying the frontal lens carrying frame 10 to position disposed at approximately 90° to the frontal lens carrying frame as shown in the drawings. While a specific structure for providing the pivotal relation between the tongues 13 and 16 has been shown, it is apparent that any other type of pivoting means may be employed to provide the pivotal hinge function.

The end portion of the frontal lens carrying frame 10 presents a terminal surface 21. This terminal surface is provided by the extension 22 of the ear 13. The end portion of the temple 12 presents the terminal surface 23. When the temple 12 is disposed at approximately 90° to the frontal lens carrying frame the terminal surfaces 21 and 23 are adapted and disposed to come into abutting contacting relation and when disposed in this relation the terminal surfaces 21 and 23 provide stop surfaces which cooperate with the hinge to prevent further pivotal movement of the temple 12 beyond the position approximately at 90° to the frontal lens carrying frame.

For providing adjustable stop means whereby the angle that the temple 12 makes with the frontal lens carrying frame 10 when the temple 12 has been swung out to the limit of possible motion with the temple 12 at approximately 90° with the lens carrying frame, a screw 24 is employed in the end portion of the temple 12. The screw is somewhat inclined relatively to the longitudinal extent of the temple 12 so that the head 25 of the screw is exposed in the region of the inner surface of the end portion of the temple 12. The head 25 of the screw is provided with a recess 26 so that the screw can be rotated using a tool such as a small screw driver. However, any other means for engagement with a tool adapted to rotate the screw may be employed. The screw 24 presents the external thread 27 which preferably is in threaded engagement both with the surrounding material of the end portion of the temple 12 and with an aperture in the offset portion 28 of the tongue 16. The end of the screw 24 which is opposite to the head 25 is of such form as to provide the stop surface 29. By rotating the screw 24 the stop surface 29 presented by the end of the screw can be continuously moved relative to the terminal surface 23 from position substantially flush with the terminal surface 23 to position substantially protruding from the terminal surface 23.

When the stop surface 29 of the end of the screw is in position substantially flush with the terminal surface 23 of the temple 12 it is apparent that the limit of outward pivotal movement of the temple 12 relative to the frontal lens carrying frame 10 is determined when the terminal surfaces 21 and 23 come into abutting contacting relation. If the temple 12 does not exert sufficient pressure against the sides of the head of a particular user of the spectacle frame when the terminal surfaces 21 and 23 are in abutting contacting relation, then it is possible by rotating the screw 24 to cause the stop surface 29 presented by the end thereof to protrude from the terminal surface 23 as shown in Fig. 1. When the screw has been adjusted to such position it is apparent that the temple 12 will make a slightly lesser angle with respect to the frontal lens carrying frame 10 when the stop surface 29 is in contact relation with the terminal surface 21 and will be held in closer proximity to the side of the head of the wearer. By adjusting the amount of protrusion of the stop surface 29 from the terminal surface 23 of the end portion of the temple 12 the angle that the temple 12 makes with the frontal lens carrying frame when the temple 12 is at the limit of outward pivotal movement can be adjusted as desired for maintaining the ear end of the temple in pressure contact with the side of the head of the wearer so as to be comfortable and at the same time prevent accidental displacement of the spectacle frame. Since the temple 12 is composed of material having substantial resiliency the ear end of the temple is maintained resiliently in contact with the side of the head of the wearer even though the angle that the end portion of the temple makes with the end portion of the frontal lens carrying frame is rigidly fixed when the stop surfaces provided by the end of the screw 24 and the terminal surface 21 are in abutting contacting relation. By having the threads 27 of the screw 24 of a relatively low pitch the screw 24, once it has been adjusted to the desire of the wearer, remains in the adjusted position until such time as the wearer may wish to make a further adjustment.

The foregoing description with respect to the screw and the stop surface 29 provided by the end thereof makes it apparent why it is preferable for the terminal surface 21 of the end portion of the frontal lens carrying frame to be provided by the extension 22 of the tongue 13. The hinge parts including the tongues are ordinarily made of some suitable metal, such as a ferrous metal, and the screw is likewise made of some suitable metal such as a ferrous metal. By utilizing the extension 22 of the tongue 13 to provide a stop surface it is apparent that the stop surfaces provided by the screw 24 and the terminal surface 21 are composed of metal thus minimizing the possibility of wear. However, if the lens carrying frame is itself composed of metal or is composed of some material such as a plastic that is relatively resistant to deformation it is not essential according to this invention that the terminal surface 21 of the frontal lens carrying frame 10 be provided by the extension 22 of the tongue 13 and the extension 22 can be omitted. Moreover, an end plate providing the terminal surface 21 may be used that is not an integral extension of the hinge tongue 13.

The offset portion of the tongue 16 is preferably shaped as shown in the drawings and may conveniently be provided by deformation of the metal of the tongue 16 so as to provide a shallow recess for accommodating the head 25 of the screw 24, thus minimizing the extent of any protrusion of the head 25 from the inner surface of the temple 12. Moreover, such construction provides a portion of the offset 28 which is substantially at a right angle with respect to the longitudinal extent of the screw 24 thereby facilitating the provision of threaded engagement between the screw 24 and the offset portion of the hinge tongue 16. While it is preferable for the threading on the screw 24 be in threaded engagement both with the offset portion of the tongue 16 and with the material of the end portion of the temple 12 such threaded engagement may be either only with the offset portion of the hinge tongue 16 or only with the material of the end portion of the temple 12.

The convenience and utility of the improved hinge structure of this invention is believed to be apparent. For adjusting the pressure of the temples of the spectacle frame against the sides of the head of the wearer all that is required for making an adjustment is the simple operation of turning a screw. In spectacle frames of the kind described a small screw driver is usually used for adjusting the pintle 19 of the hinge and is frequently supplied to a purchaser for this purpose. The same screw driver can be used to adjust the position of the screw 24 for determining the angle that the temple 12 makes with the frontal lens carrying frame 10 when the stop surface 29 of the screw is in contacting relation with the terminal stop surface 21 presented by the end portion of the lens carrying frame. This adjustment can be accomplished when the spectacle frame is initially being fitted to the user and the user likewise can make further adjustments from time to time according to his wishes merely by turning the screw 24. In this way exactly the desired pressure at all times can be provided in a positive way. In addition to the foregoing advantages the adjustable stop means of this invention is such that it does not detract appreciably from the overall appearance of the spectacle frame and there is likewise no substantial increase in weight or bulk. The aforesaid advantages and improvements have been provided in a very inexpensive way so that the added cost as compared with an ordinary spectacle frame is negligible. All that is required is a small and inexpensive screw and the drilling of a hole in the end portion of the temple 12 so as to accommodate the screw. The offset 28 in the tongue can be effected by a simple and inexpensive stamping operation.

While a specific preferred embodiment of this invention has been shown in the drawings and described hereinabove it is apparent that the specific structure shown and described can be varied within the scope and according to the above described principle of this invention. Thus, it is apparent that the hinge parts can be reversed so that the screw 24 will be located in the end portion of the frontal lens carrying frame rather than in the end portion of the temple 12. Any such simple reversal of the parts utilizes the principle of this invention. While it is preferable that the tongue 16 contain an offset through which the screw 24 passes together with an extension going beyond the offset it is apparent that the tongue 16 can be made of lesser extent and attached to the temple 12 as by the rivets 14 at any other desired location. If the hinge tongue 16 extends only up to the region of the offset 28 and so as not to include the offset 28 then it is apparent that the screw 24 merely passes through the material of the end portion of the temple 12 and such construction may, if desired, be employed according to this invention. Instead of having the screw inclined so that the manually rotatable end protrudes from the inner surface of the end portion of the temple 12, this end of the screw may be made accessible from some other surface of the temple such as the outer surface and in such case it is obvious that its functional utility would be essentially the same as that of the preferred embodiment which has been shown in the drawings and described hereinabove. Moreover, instead of a screw some other adjustably carried part and means for holding it in a plurality of fixed positions may be employed for providing the adjustable stop means. More generally it is to be understood as being according to the principle of this invention to provide the terminal or stop surfaces for the end portions of the frontal lens carrying frame and the temple so that at least one of these terminal or stop surfaces is adjustable in a plurality of fixed positions whereby the angle that at least one of the temples of a spectacle frame makes with respect to the frontal lens carrying frame when swung out to the limit of permitted pivotal motion may be determined in any of a plurality of positively fixed positions according to the desire of the wearer for controlling the amount of pressure contact that the temples exert against the sides of the head of the wearer.

I claim:

1. In combination in a spectacle frame comprising a frontal lens carrying frame and temples, a hinge structure for attaching at least one of said temples to an extremity of said frontal lens carrying frame which comprises a hinge that has pivotally connected tongue members one of which is attached to the inner surface of an end portion of said frontal lens carrying frame and the other of which is attached to the inner surface of the adjacent end portion of said temple and that is adapted to permit pivotal movement of said temple from position approximately 90° to said frontal lens carrying frame toward position overlying said frontal lens carrying frame, said end portion of said frontal lens carrying frame and said end portion of said temple presenting terminal surfaces which are adapted and disposed to come into opposed relation when said temple is in said position approximately 90° to said frontal lens carrying frame and to cooperate with said hinge to prevent pivotal movement of said temple beyond said approximately 90° position, the terminal surface of said frontal lens carrying frame being disposed at an angle substantially greater than 90° with respect to the inner surface of said frontal lens carrying frame a screw which passes through the hinge tongue comprised in said end portion of said temple and which is in threaded engagement with said end portion of said temple and angularly disposed with respect thereto from a manually rotatable end exposed for actuation on the inner surface of said temple to an opposed stop end adapted to be moved upon rotation of said screw from position substantially flush with the terminal surface of said end portion to position substantially protruding therefrom for contact with said terminal surface of said end portion of said lens carrying frame.

2. In combination in a spectacle frame comprising a frontal lens carrying frame and temple, a hinge structure according to claim 1 wherein the tongue of said hinge attached to said end portion of said temple has an offset portion substantially at right angles with respect to said screw and through which said screw passes and an extension therebeyond secured to said end portion of said temple.

3. In combination in a spectacle frame comprising a frontal lens carrying frame and temples, a hinge structure for attaching at least one of said temples to an extremity of said frontal lens carrying frame which comprises a hinge that has pivotally connected tongue members one of which is attached to the inner surface of an end portion of said frontal lens carrying frame and the other of which is attached to the inner surface of the adjacent end portion of said temple and that is adapted to permit pivotal movement of said temple from position approximately 90° to said frontal lens carrying frame toward position overlying said frontal lens carrying frame, said end portion of said frontal lens carrying frame and said end portion of said temple presenting terminal surfaces which are adapted and disposed to come into opposed relation when said temple is in said position approximately 90° to said frontal lens carrying frame and to cooperate with said hinge to prevent pivotal movement of said temple beyond said approximately 90° position, an extension of the tongue member attached to said end portion of said lens carrying frame which provides said terminal surface of said end portion and which is disposed at an obtuse angle with respect to the balance of said tongue member, an offset between the ends of the tongue member attached to said end portion of said temple having an aperture therein, a screw in threaded engagement with said aperture having a manually rotatable end and an opposite stop end adapted to be moved from position substantially flush with the terminal surface of said end portion of said temple to position substantially protruding therefrom for contact with said terminal surface of said end portion of said lens carrying frame provided by said tongue extension, said offset providing a recess into said end portion of said temple, said screw being inclined relative to the longitudinal extent of said temple from the stop end thereof substantially at the terminal surface of said end portion of said temple to said manually rotatable end thereof with said manually rotatable end disposed in said recess, and said offset being disposed at substantially a right angle with respect to said screw and in substantially opposed spaced relation with respect to said terminal surface of said end portion of said temple.

4. In combination in a spectacle frame comprising a frontal lens carrying frame and temples, a hinge structure according to claim 3 wherein said end portion of said temple is composed of plastic material, said screw passes through said plastic material between said offset and said terminal surface, and said tongue attached to said end portion of said temple comprises an extension that extends beyond said offset and that is attached to said end of said temple.

References Cited in the file of this patent

UNITED STATES PATENTS

| 1,966,030 | Favre | July 10, 1934 |
| 2,145,307 | Hunt | Jan. 31, 1939 |

FOREIGN PATENTS

| 788,230 | France | July 22, 1935 |
| 458,990 | Great Britain | Dec. 31, 1936 |